Sept. 3, 1957 P. A. FLADUNG 2,805,075
TRACTOR DRAWN AGRICULTURAL IMPLEMENT
Filed Aug. 16, 1955 2 Sheets-Sheet 1
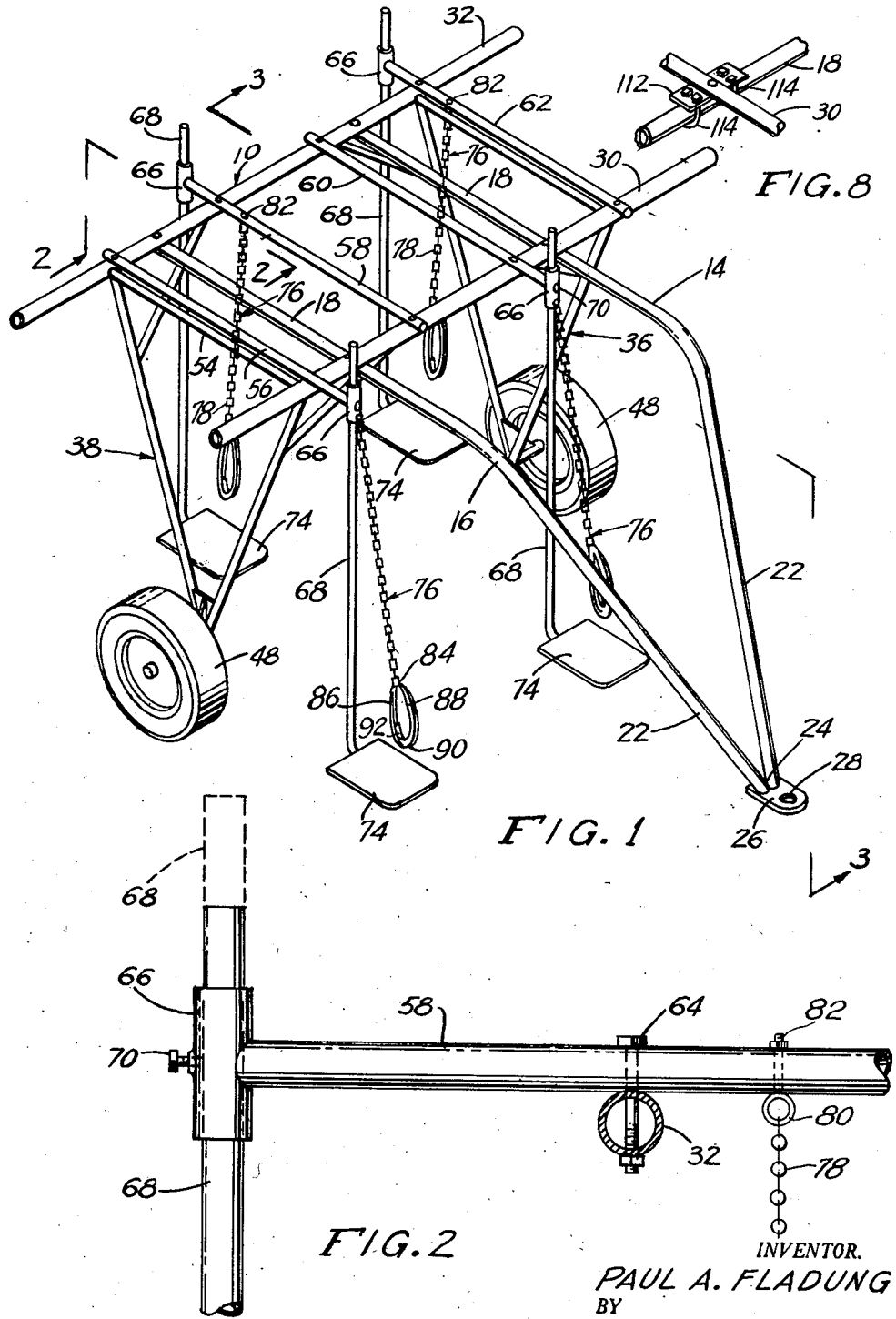
INVENTOR.
PAUL A. FLADUNG
BY
McMorrow, Berman + Davidson
ATTORNEYS Sept. 3, 1957 P. A. FLADUNG 2,805,075
TRACTOR DRAWN AGRICULTURAL IMPLEMENT
Filed Aug. 16, 1955 2 Sheets-Sheet 2
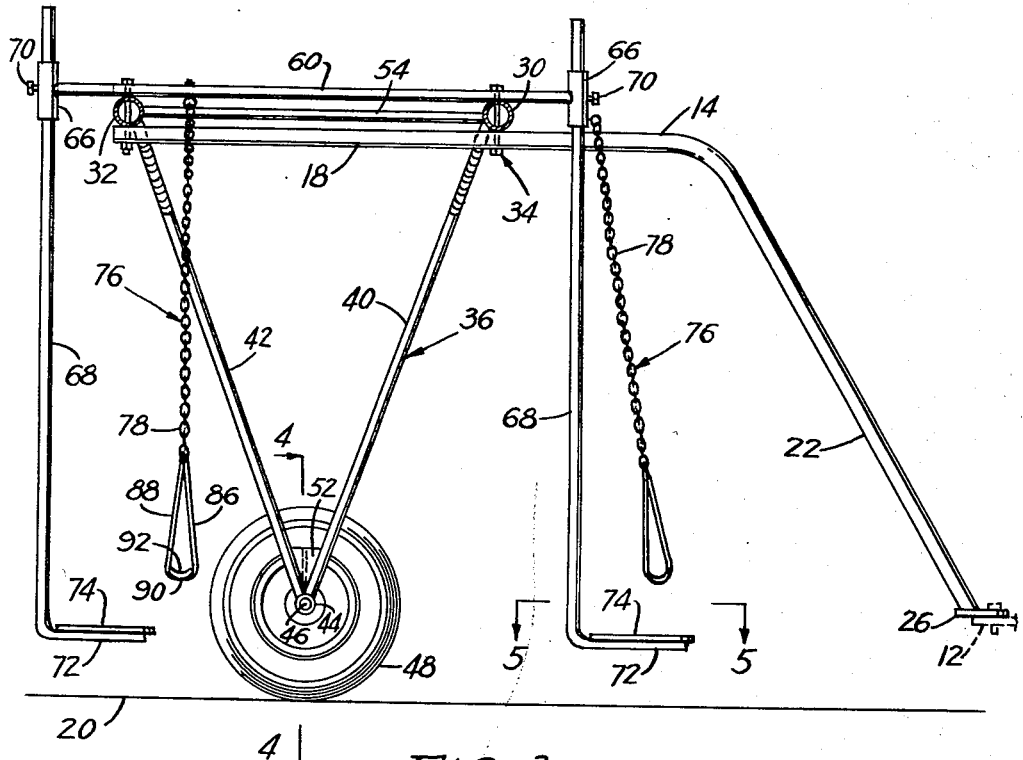
FIG. 3
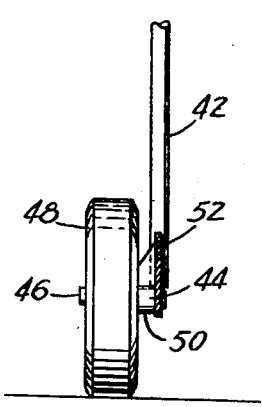
FIG. 4
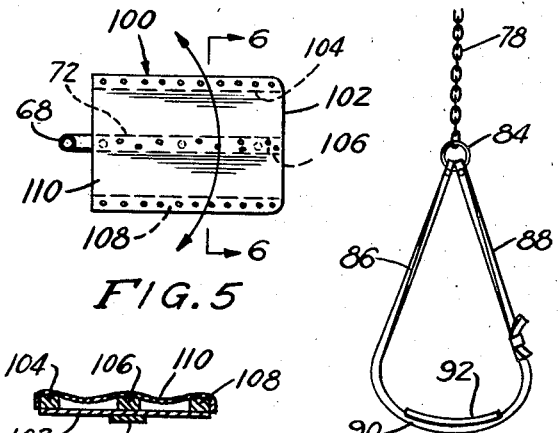
FIG. 5
FIG. 6
FIG. 7
INVENTOR.
PAUL A. FLADUNG
BY
McMorrow, Berman + Davidson
ATTORNEYS United States Patent Office 2,805,075
Patented Sept. 3, 1957

2,805,075
TRACTOR DRAWN AGRICULTURAL IMPLEMENT

Paul A. Fladung, Wellington, Colo.

Application August 16, 1955, Serial No. 528,601

3 Claims. (Cl. 280—32.5)

This invention relates to an improved agricultural implement adapted to be drawn by a tractor for conveying a number of workers in different positions required for manually planting, weeding, thinning, or cultivating operations on a plurality of parallel rows of plants.

A primary object of this invention is to provide a generally improved device of the character indicated above, which includes worker conveying platforms which can be selectively adjusted to different heights above the ground surface over which the device is drawn, and to different angles to the rows of plants being worked.

Still another object of this invention is to provide a device of the type described which is of simple, yet rugged, construction and can be manufactured at low cost.

Other objects and advantages will become apparent from the following detailed description, forming the specification, and taken in conjunction with the accompanying drawings, in which:

Figure 1 is a front perspective view of an implement embodying this invention, worker supporting harnesses not being shown;

Figure 2 is a fragmentary vertical longitudinal sectional view, on an enlarged scale, taken on the line 2—2 of Figure 1, and showing an upper rear portion of the frame and adjustable worker platform conveying means and an associated worker harness;

Figure 3 is a vertical longitudinal sectional view taken substantially on line 3—3 of Figure 1, and showing worker harnesses;

Figure 4 is a vertical cross sectional view taken along line 4—4 of Figure 3 and looking in the direction of the arrows;

Figure 5 is a horizontal sectional view showing a modified form of worker-supporting platform taken substantially on line 5—5 of Figure 3;

Figure 6 is a cross sectional view taken along line 6—6 of Figure 5;

Figure 7 is a side elevational view of the lower portion of a worker harness; and, Figure 8 is a fragmentary perspective view of a modified form of a connection between the forward portions of frame side members and a cross bar.

With continued reference to the drawings, the illustrated implement, generally indicated at 10, is adapted for detachable connection to a tractor drawbar 12 (Figure 3).

The implement 10 comprises a pair of horizontal, laterally spaced, longitudinal bars 14 and 16 having on their forward ends forwardly declining and forwardly converging draft bars 22 which are secured at their depressed forward ends, as indicated at 24, to a horizontally extending hitch plate 26 having an opening 28 and adapted for the reception therethrough of a hitch pin to detachably connect the hitch plate to the tractor drawbar 12.

A pair of spaced, parallel, front and rear tubular cross bars 30 and 32 extend across the bars 18 and beyond the outer sides thereof, as shown in Figure 1, and secured thereon by bolts 34.

A pair of inverted triangular wheel supporting struts 36 and 38 are located between and are dependingly secured at their upper ends to the cross bars 30 and 32 at the outer sides of and laterally spaced from the bars 18, each of which struts includes front and rear rods 40 and 42 in downwardly converging relation, and a wheel journal 44 is secured to the lower ends of the rods 40 and 42 and carries a wheel axle 46 upon which a ground-engaging wheel 48 is rotatably mounted with a spacer collar 50 on the axle 46 and interposed between the journal 44 and the wheel hub, as shown in Figure 4. A gusset plate 52 extends between the rods 40 and 42 at their converging ends to impart rigidity thereto at this point and provide a stable connection for the journal 44.

Each of the wheel struts includes a horizontally disposed rod 54 extending between the cross bars 30 and 32 at the connection of the cross bars with the convergent rods 40 and 42.

A plurality of spaced, parallel horizontal longitudinal rods 56, 58, 60 and 62 extend across the tops of and are secured by bolts 64 to the cross bars 30 and 32 intermediate the ends thereof and in parallel relation to the bars 18. The rods 58 and 62 are secured adjacent opposite ends thereof to the cross bars 30 and 32 and project rearwardly beyond the rear cross bar 32, while the rods 56 and 60 project forwardly beyond the front cross bar 30.

Fixed on the free ends of the projecting portions of the rods 56, 58, 60, and 62 are vertically disposed tubular sleeves 66. Upper end portions of vertical platform supporting legs 68 are rotatably and slidably engaged in the sleeves 66. Each of the sleeves 66 is provided with a set screw 70 whereby the associated leg 68 can be locked in the sleeve at selected heights and in selected rotated positions.

At their lower ends the legs 68 are provided with laterally extending arms 72 upon which are secured horizontally disposed worker platforms 74, upon each of which a worker can kneel or stand during operation of the implement 10. It will be noted that due to the spacing of the rods 56, 58, 60, and 62, one of the forward platforms 74 is located between the draft bars 22 and the other forward platform at the outer side of one of the draft bars 22. One of the rear platforms 74 is located between the forward platforms and the other rear platform is located laterally outwardly of the remaining draft bar 22. This permits workers to operate along different plant rows.

Adjacent each of the legs 68 is a depending worker harness, generally indicated at 76, which comprises a line, which may be in the form of a chain 78, secured at one end to an eye 80 of an eye bolt 82 secured to sleeves 66 or to rearward portions of related ones of the rods 56, 58, 60, and 62. At its other end, each of the lines or chains 78 is provided with a ring 84 to which are secured opposite ends of connected together straps 86 and 88 to form a loop. The inner surface of the bight portion 90 of the loop is preferably provided with a pad 92 of a soft, resilient material.

In use, the harnesses are engaged about the chests of the workers on the platform 74.

In the modified form of the platform, generally indicated at 100 and shown in Figures 5 and 6, there is provided a flat, generally rectangular platform base 102 secured centrally longitudinally upon the laterally extending arm 72 of each of the legs 68. Transversely spaced, longitudinally extending blocks 104, 106 and 108 are secured on the upper surface of the generally horizontally disposed base 102 with the blocks 104 and 108 disposed along opposite longitudinal edges and the block 106 longitudinally along the center of the base. A piece of heavy cloth fabric 110, of generally rectangular shape, is secured along opposite longitudinal edges to the outer longitudinal sides of the blocks 104 and 108 and extends thereover, and is secured by suitable fastener means to the tops of the blocks 104 and 108. The fabric 110 is so arranged as to assume concave form in the space between the blocks 104 and 106, and in the space between the blocks 106 and 108. The fabric may also be secured by suitable fastening means to the upper surface of the block 106. This provides a comfortable resting support for the knees and lower portions of the legs of a worker in kneeling position on the platform 100.

In Figure 8, there is shown a modified form of connection between the bars 18 of the draft means, and each of the cross bars 30 and 32 at their points of intersection, comprising rectangular plates 112 secured on the bars 18 at the points of intersection of the cross bars therewith and secured thereto by U-bolts 114 adjacent opposite ends thereof and extending around the bars 18. The cross bars, such as the cross bar 30 is, as shown in Figure 8, placed on top of the plate 112 between the U-bolts 114, and a bolt is passed through the cross bar, the plate 112, and the bar 18, to more securely and rigidly fasten these elements together and lend rigidity to the entire structure.

While there is shown and described the preferred embodiment of the invention, it is to be understood that the structure is susceptible to change and modification within the practicability of the invention and therefore should be limited only by the scope of the claims appended hereto.

What is claimed is:

1. In an agricultural implement, a horizontal frame having front and rear ends and opposite sides, wheel struts secured to the opposite sides of said frame and depending therefrom, said struts being located between the front and rear ends of the frame and having lower ends ground engaging wheels mounted on the lower ends of the struts, draft means secured to the frame and projecting forwardly beyond the front end of the frame, front and rear vertical legs having upper ends secured to the front and rear ends, respectively, of the frame, said legs having lower ends, and horizontal platforms on the lower ends of said legs, said frame comprising spaced front and rear cross bars, longitudinal bars extending between and secured to the front and rear cross bars, said longitudinal bars being laterally spaced from each other, alternate ones of said longitudinal bars having forward ends projecting forwardly from said front cross bar and rearward ends projecting rearwardly beyond said rear cross bar, the front vertical legs being mounted on said forward ends of longitudinal bars and the rear vertical legs being mounted on said rearward ends of longitudinal bars.

2. In an agricultural implement, a horizontal frame having front and rear ends and opposite sides, wheel struts secured to the opposite sides of said frame and depending therefrom, said struts being located between the front and rear ends of the frame and having lower ends, ground engaging wheels mounted on the lower ends of the struts, draft means secured to the frame and projecting forwardly beyond the front end of the frame, front and rear vertical legs having upper ends secured to the front and rear ends, respectively, of the frame, said legs having lower ends, and horizontal platforms on the lower ends of said legs, said frame comprising spaced front and rear cross bars, longitudinal bars extending between and secured to the front and rear cross bars, said longitudinal bars being laterally spaced from each other, alternate ones of said longitudinal bars having forward ends projecting forwardly from said front cross bar and rearward ends projecting rearwardly beyond said rear cross bar, the front vertical legs being mounted on said forward ends of longitudinal bars and the rear vertical legs being mounted on said rearward ends of longitudinal bars, said draft means comprising laterally spaced longitudinal draft bars extending between and secured to the front and rear cross bars of the frame, said draft bars having forward ends having forwardly declining converging portions having forward ends, and a hitch plate secured to the forward ends of said portions.

3. In an agricultural implement, a horizontal frame having front and rear ends and opposite sides, wheel struts secured to the opposite sides of said frame and depending therefrom, said struts being located between the front and rear ends of the frame and having lower ends, ground engaging wheels mounted on the lower ends of the struts, draft means secured to the frame and projecting forwardly beyond the front end of the frame, front and rear vertical legs having upper ends secured to the front and rear ends, respectively, of the frame, said legs having lower ends, and horizontal platforms on the lower ends of said legs, said frame comprising spaced front and rear cross bars, longitudinal bars extending between and secured to the front and rear cross bars, said longitudinal bars being laterally spaced from each other, alternate ones of said longitudinal bars having forward ends projecting forwardly from said front cross bars and rearward ends projecting rearwardly beyond said rear cross bar, the front vertical legs being mounted on said forward ends of longitudinal bars and the rear vertical legs being mounted on said rearward ends of longitudinal bars, and means securing the legs to the frame comprising vertical sleeves fixed on the forward and rearward ends of longitudinal bars with the upper end portions slidably and rotatably engaged through the sleeves, and locking means acting between the sleeves and the upper portions of related legs and locking the legs in selected vertical and rotated positions in the sleeves.

References Cited in the file of this patent

UNITED STATES PATENTS

| | | |
|---|---|---|
| 1,370,347 | Nelson | Mar. 1, 1921 |
| 2,504,403 | Finley | Apr. 18, 1950 |
| 2,514,249 | Madsen | July 4, 1950 |